United States Patent [19]

Hesse et al.

[11] Patent Number: 4,721,001
[45] Date of Patent: Jan. 26, 1988

[54] ARRANGEMENT FOR MECHANICAL MEASUREMENT AND REGULATION OF PULLING FORCE OF TRACTOR

[75] Inventors: Horst Hesse; Günther Schwerin, both of Möglingen; Werner Steprath, Dormagen, all of Fed. Rep. of Germany

[73] Assignee: Robert Bosch GmbH, Stuttgart, Fed. Rep. of Germany

[21] Appl. No.: 753,672

[22] Filed: Jul. 10, 1985

[30] Foreign Application Priority Data

Jul. 28, 1984 [DE] Fed. Rep. of Germany ....... 3427907

[51] Int. Cl.⁴ .......................................... A01B 63/112
[52] U.S. Cl. .............................. 73/862.57; 73/862.62; 172/7
[58] Field of Search .................. 172/7, 9; 73/862.45, 73/862.46, 862.47, 862.48, 862.57, 862.62, 862.64

[56] References Cited

U.S. PATENT DOCUMENTS

| 2,319,299 | 5/1943 | Converse | 73/862.62 |
| 3,795,140 | 3/1974 | Nishihara | 73/862.62 |
| 4,513,826 | 4/1985 | Steprath et al. | 172/7 |

FOREIGN PATENT DOCUMENTS 2417055 10/1974 Fed. Rep. of Germany ... 73/862.57
WO82/02815 9/1982 PCT Int'l Appl. .

Primary Examiner—Richard T. Stouffer
Attorney, Agent, or Firm—Michael J. Striker

[57] ABSTRACT

An arrangement for mechanical measurement and for regulation of a pulling force of a tractor, has a bending-elastic element whose bending is sensed by a sensing device which acts on a lifting device for a three-point linkage of the tractor, wherein the bending-elastic element is formed as a pin which is hollow and supports one link of the linkage between two housing-fixed bearing points, and the sensing device has a gauge stick which extends inside the pin substantially between both housing-fixed bearing points.

11 Claims, 12 Drawing Figures

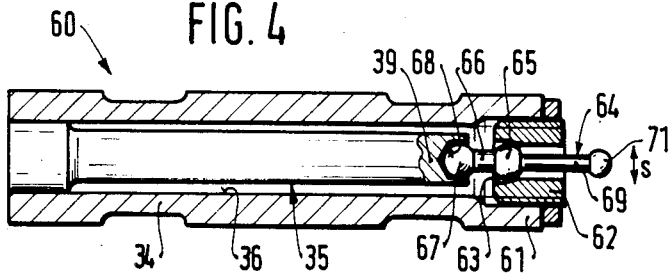
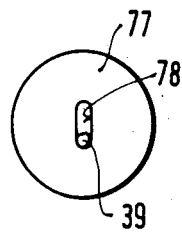
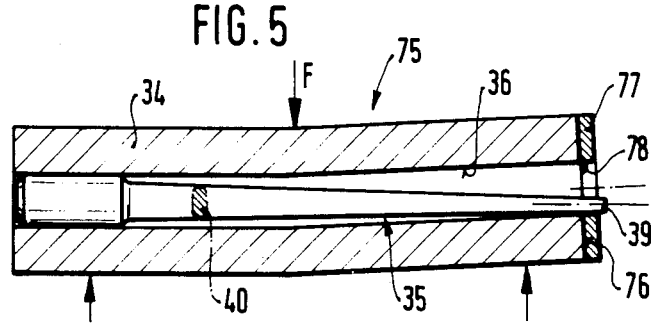
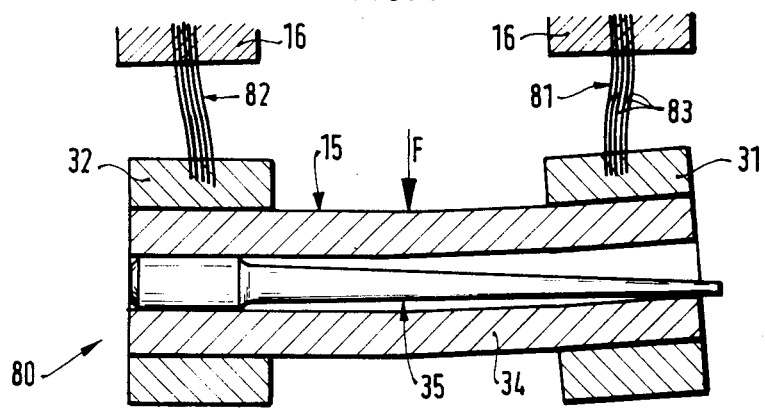

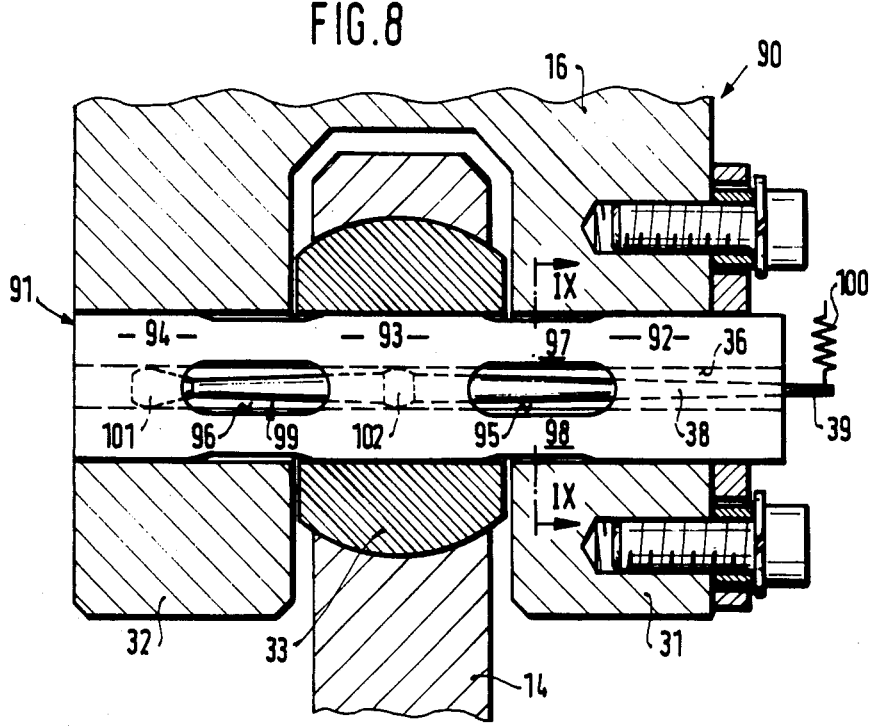
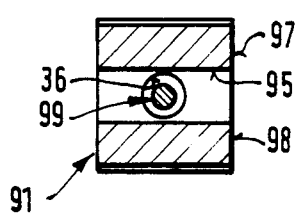
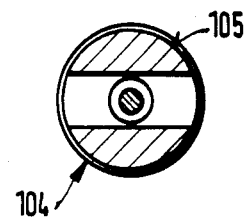

ARRANGEMENT FOR MECHANICAL MEASUREMENT AND REGULATION OF PULLING FORCE OF TRACTOR

BACKGROUND OF THE INVENTION

The present invention relates to an arrangement for mechanical measurement and for regulation of a pulling force of a tractor.

Arrangements of the above mentioned general type are known in the art. One arrangement for regulating the pulling force in the lower link of a plow mounted on a tractor is disclosed in U.S. Pat. No. 3,812,916. It has a gauge member which is formed as a bending rod supported twice in the tractor housing. Both lower links engage outside of the bearing points with the bending stick. A gauge stick formed as a free support is arranged between both bearing points and is clamped with its one end near one bearing point on the bending gauge, whereas its another freely projecting end detects near the other bearing point the bending of the bending stick. The displacement signal of the gauge stick dependent on the pulling force is transmitted via a mechanical regulating rod to the hydraulic control member for the power lift. The disadvantage of this arrangement is first of all that here to construction of the tractor housing on the through going bending axle must be determined. This arrangement with the bending axle is expensive. In many tractor constructions the space for the throughgoing bending axle is not available and thereby this arrangement cannot be used. The exchange of defective structucal part, particularly of the bending axle and the gauge stick is difficult. Furthermore, during bending of the bending stick friction takes place in the bearing points which leads to a respective hysteresis. It is also disadvantageous that this arrangement with the throughgoing bending stick for mechanical measurements has difficulties to be converted to a non-mechanical measuring processes. In many cases it can also be disadvantageous that here only sum of the lower link forces are determined.

Another arrangement for mechanical measurements and for regulation of the pulling force of a tractor by means of an electro-hydraulic lifting mechanism-regulating device is disclosed in the W 082/02815. Here also the bending axle is supported in the housing twice. The bending of the bending axle is detected by a sensing device, and for this purpose at each end of the bending axle coaxially extending gauge sticks are mounted. They extend through the housing-fixed sleeves and actuate with their free end respective inductively operating displacement pickup. In this manner the arrangement with the throughgoing bending axle can be used for an electro-hydraulic lifting mechanism-regulating device. This arrangement has, however, the disadvantage that the bending axle is very long in the longitudinal direction. Here also the bending axle is accessible with difficulties. It also has friction at its bearing points and therefore the resulting hysteresis. The arrangement is thereby expensive and not resistant to vibrations.

SUMMARY OF THE INVENTION

Accordingly, it is an object of the present invention to provide an arrangement for mechanical measurement and for regulation of a pulling force of a tractor, which avoids the disadvantages of the prior art.

More particularly, it is an object of the present invention to provide an arrangement for mechanical measurement and for regulation of a pulling force of a tractor, which is very simple and robust, and which can also carry especially high forces.

In keeping with these objects and with others which will become apparent hereinafter, one feature of the present invention resides, briefly stated, in an arrangement for mechanical measurement and for regulation of a pulling force of a tractor in which a bending-elastic structural element is formed as a pin with which a single link is supported between two housing-fixed bearing points, the pin is hollow and receives in its interior a measuring stick which extends substantially between both housing-fixed bearing points.

By the position of the available pin for linking a link to the housing which is used simultaneously as a gauge member, a compact construction of the arrangement is provided. Moreover, the mechanical gauge pins are easily exchangeable with pins of other constructions, so that the arrangement can be easily converted to other measuring processes. Because of the compact construction, the arrangement also has a sufficiently high efficiency, strength and accuracy.

In accordance with another advantageous feature of the present invention, the pin is formed relative to the bearing points as a support which lies freely at two sides, and the gauge stick is formed as a free support which is fixedly clamped in the region of one bearing point and whose free end extends at least in the region of the other bearing point. The combination of a pin which lies freely at both sides, with a gauge stick formed as a free support provides for an especially simple compact and robust construction which is convenient for mounting and produces a relatively high output signal.

In accordance with another feature of the present invention, the control signal is determined by such a magnitude which forms a tangent to the bending line of the bent pin at the mounting point of the gauge stick in the region of one bearing point with unloaded pin in form of an angle, and particularly the distance pertaining to this angle in the region of the other bearing point or in the outwardly adjoining region is determined. Also the control signal can be determined as the angle which is formed by the tangents to the bending line of the pin in both bearing points, relative to one another, especially the distance associated with this angle in the region outwardly adjoining the other bearing point. In this case the output signal is further increased, and its reception and transmission is favorably designed.

A further feature of the present invention is that the pin relative to both bearing ears is formed as two-side fixedly clamped support. In this construction accurately reproducible measurements can be provided, since the support points in the bearing points do not change under loading and thereby the hysteresis is reduced. Also the wear conditions of the arrangement are improved.

In accordance with an especially advantageous feature of the present invention the bearing ears are connected via bending-elastic hinges associated with the bending of the pin, with the machine housing, and the gauge stick is formed as a free support fixedly clamped in the region of one bearing ear. In this construction an edge pressure on the gauge pin is avoided, therefore hysteresis-free and high output signal is maintained.

Still a further feature of the present invention is that the pin has recesses located at both sides of the link, so that the central portion which carries the link is connected via leaf-spring shaped element with the end portions lying in the bearing points, and the gauge stick in the region of the front bearing point and the link is guided in the pin particularly with its spherical portion, whereas its free end lies at least in the region of the other bearing point or in the region adjacent to the same. In this construction no additional means for preventing rotation of the pin must be provided.

In accordance with another advantageous feature of the present invention the inner wall of the pin is formed as an abutment for the gauge stick so that a load limit for the gauge pin is provided.

Still another feature of the present invention is a guiding slot which limits the movement of the free end of the gauge stick in the measuring plane and therefore limits the movement freedom to the measuring plane.

An especially advantageous feature of the present invention is that a transmission member is supported in the pin in the region of the portion associated with the free end of the gauge stick to increase the displacement signal. Thereby in the interior of the gauge pin, a further amplification of the output signal takes place, therefore the arrangement is especially space-economical and simple.

A displacement pick-up can be arranged on an extension of the pin-sleeve extending over the bearing point, which provides an especially advantageous support for the displacement pick-up on the gauge pin. Thereby the gauge pin can measure pulling and pressing forces also when it is supported with play in the bearing points. In addition a high output signal is produced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a view showing a longitudinal section of the gauge pin in accordance with a second embodiment of the invention with integrated amplification;

FIG. 5 is a view showing a longitudinal section of the gauge pin in accordance with a third embodiment of the present invention;

FIG. 6 is a side view of the gauge pin of FIG. 5;

FIGS. 7 and 8 are views showing a part of the arrangement in accordance with the second and third embodiment in a simplified manner, with the gauge pin fixably clamped at both sides;

FIG. 9 is a view showing a section taken along the line IX—IX in FIG. 8;

FIG. 11 is a view showing a cross-section of the embodiment of FIGS. 8 or 9.

DESCRIPTION OF THE PREFERRED EMBODIMENTS

Figure 1:
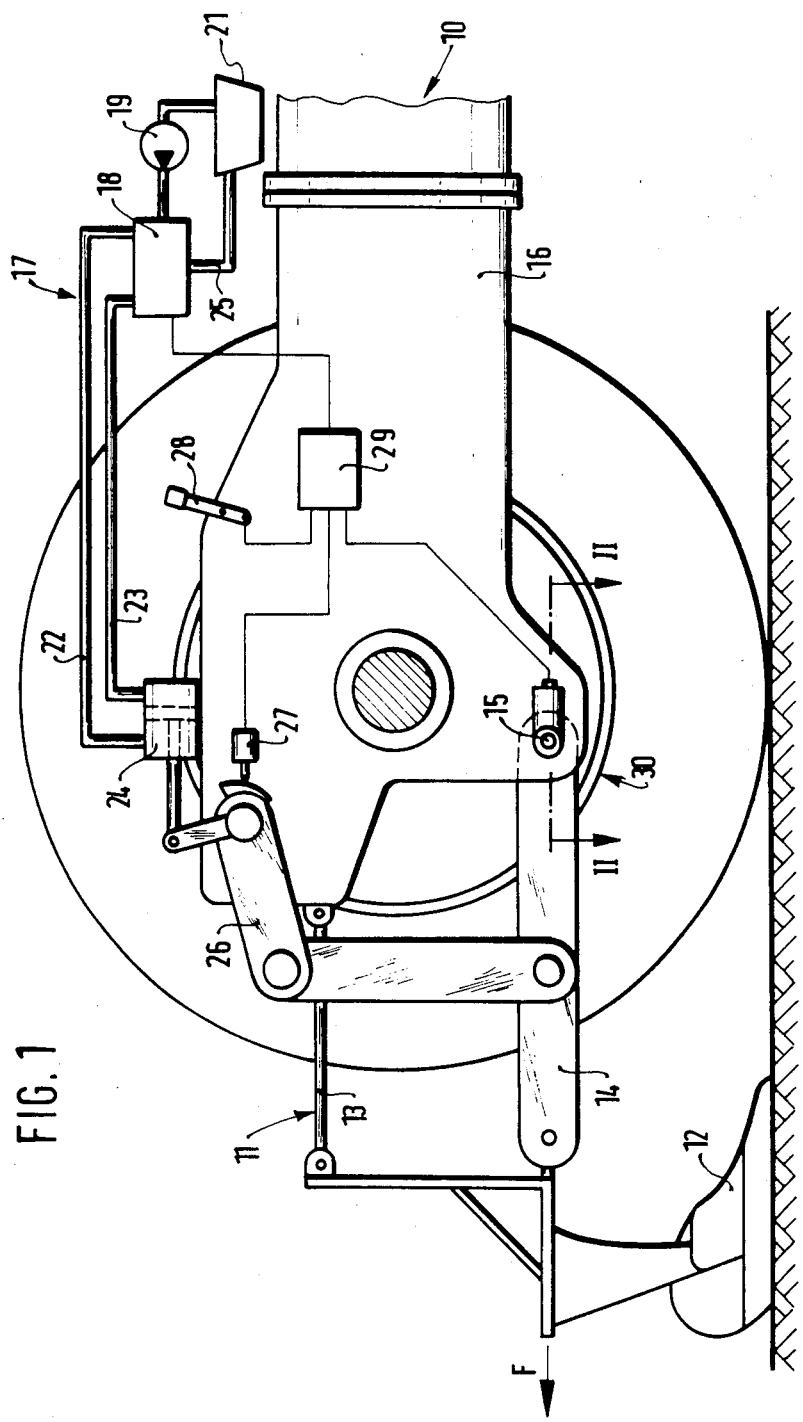
FIG. 1 is a simplified illustration of a side view of the rear part of a tractor with a plow connected therewith and with an arrangement for mechanical measurement and for regulation of the pulling force of the tractor in accordance with the present invention.

FIG. 1 shows a part of a tractor 10 with a plow 12 articulatedly connected with the same via a conventional three point linkage 11. The three point linkage has an upper link 13 and two lower links of each on one lower link 14 is shown for the sake of simplicity. The lower link 14 is turnably mounted on a housing 16 of the tractor 10 by a pin which is simultaneously formed as a mechanical gauge pin 15.

For lifting and lowering of the plow 12, a hydraulic device 17 is provided on the tractor 10. A regulating valve 18 is a part of the hydraulic device 17. The regulating valve 18 controls a hydraulic power lift 24 via two hydraulic conduits 22 and 23 and is unloadable to a tank 21 via a return conduit 25. For actuating the three point linkage 11, the power lift 24 is articulatedly connected via a lifting linkage 26 with the lower link 14.

The gauge pin 15 which serves as an actual value transmitter for the pulling force, a transmitter 27 which serves as an actual value transmitter for the position, a lever 28 which serves as an nominal value transmitter, and the regulating valve 18 are in operative connection with one another via a known mechanical regulating linkage 29. The regulating linkage 29 which is shown in simplified manner processes the actual and nominal values given as displacements so that various regulating modes are possible. The regulating linkage 29 is in operative communication with the other gauge pin in a not shown manner, with which the not shown second lower link is supported on the housing 16 of the tractor 10. Since the support of both lower links in the housing is symmetrical relative to one another, and formed identically, always the lower link 14 with its gauge pin 15 will be considered herein below. The gauge pin 15 is a part of an arrangement suitable for mechanically measuring and regulating the pulling force of the tractor 10.

Figure 2:
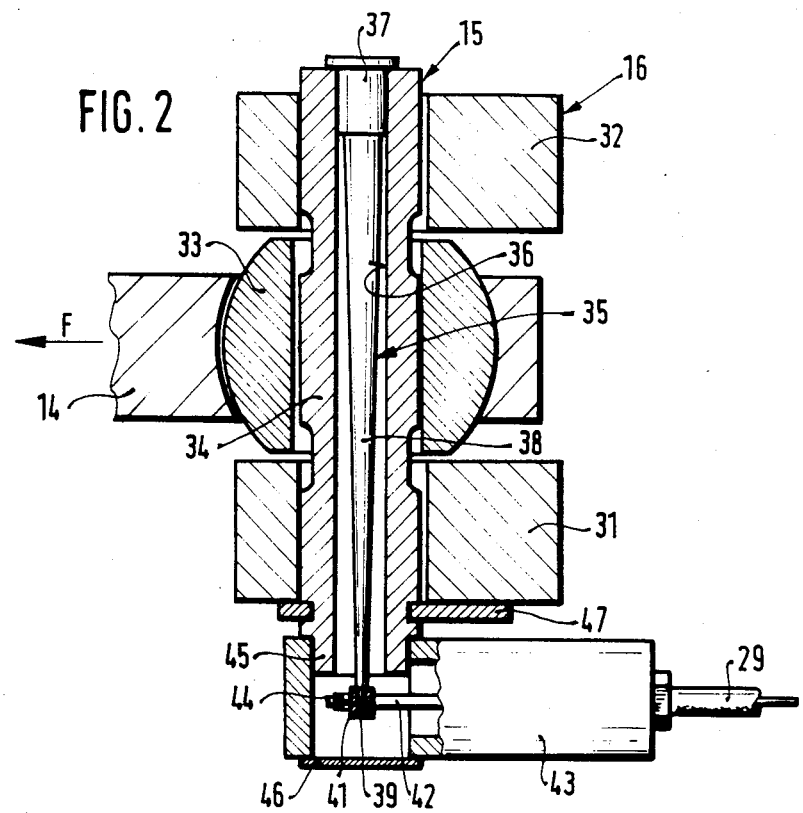
FIG. 2 is a view showing a longitudinal section taken along the line II—II in FIG. 1 through a gauge pin of the arrangement of FIG. 1.

A section of the support of the lower link 14 in the housing 16 of the tractor 10, taken along the line II—II in FIG. 1, is shown in FIG. 2. As can be clearly seen from FIG. 1, there are an outer bearing ear 31 and an inner bearing ear 32 which form bearing points fixed with the housing. A spherical sleeve 33 of the lower link 14 is located between the bearing ears. The gauge pin 15 extends through both bearing gears 31, 32 and the spherical sleeve 33 located therebetween.

The gauge pin 15 is composed substantially of a tubular sleeve 34 and a gauge stick 35 located inside the sleeve. The sleeve 34 forms a springy bending-elastic structural element and is composed for this purpose of a suitable material which has not only a high strength but also a suitable elasticity, for example of steel. The sleeve 34 is formed with such a play in both bearing ears 31, 32 and in the spherical sleeve 33 that when it bends under the action of pulling force engaging the lower link 14, the loading case corresponds to a two-side free lying support. The gauge stick 35 which is arranged in a throughgoing opening 36 of the sleeve 34 is not formed as a bending elastic structural element but instead during bending of the sleeve 34 it maintains its rigid form. The gauge stick 35 has at its one end a short cylindrical portion 37 with which it is firmly clamped in the opening 36. The clamping point of the gauge stick 35 is therefore offset as far as possible outwardly in the sleeve 34 and lies in addition in the region of the inner bearing ear 32. The clamping point thus lies at the end of the bending line, so that the deformation of the sleeve 34 can be fully used. It can lie directly at the end of the sleeve whereby no relative movements in the clamping point takes place.

The gauge stick 35 has a continuously narrowing conical portion 38 extending from the cylindrical portion 37. The portion 38 extends with its free end 39 outwardly beyond the opening 36 at the other end of the sleeve 34. The free end 39 carries a roller 41 which is coupled with a movable part 42 of a displacement pick-up 43. This connection can be adjusted in a play-free manner by an adjusting screw 44. The displacement pick-up 43 is mounted on a collar-like extension 45 of the sleeve 34. The opening 36 and the inner space of the displacement pick-up 43 are closed from outside by a cover 46. The stroke of the free end 39 detected by the displacement pick-up 43 is transferred to the regulating linkage 29. The axial position of the gauge pin 15 in the bearing ears 31, 32 is determined by a holding plate 47 mounted on the outer bearing ear 31. It can additionally secure the turning position of the gauge pin 15. The gauge stick 35 forms because of its construction and arrangement in the sleeve 34 a cantilever clamp fixed at its one side. Its clamping point 37 and its signal pick-up at the end 39 are located as far as possible from one another, and especially its signal pick-up at the end 39 is located outside of the bearing ear 31 and not between the bearing ears 31 and 32.

Figure 3:
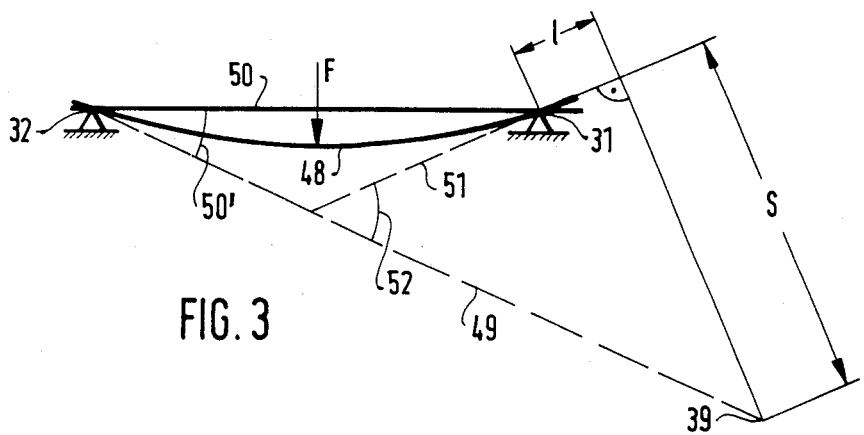
FIG. 3 is a simplified graphic illustration of the conditions of the loaded gauge pin of FIG. 2.

The operation of the arrangement can be understood from the consideration of FIGS. 1, 2 and also FIG. 3. FIG. 3 illustrates the operation of the regulating device based on known principles. For example, in the event of pure pulling force regulation, the actual value of the pulling force produced by the gauge pin 15 is compared with the nominal value given by the lever 28 in the regulating linkage 29. Depending on a differential signal produced thereby, the hydraulic device lifts or lowers the lifting linkage 26 of the lower link 14 so as to bring to zero the regulating deviation.

When the tractor 10 trails the plow 12, pulling force F takes place in the lower link 14. It is distributed from the sleeve 34 of the gauge pin 14 onto both bearing ears 31 and 32. The sleeve 34 bends as shown in FIG. 3 in a simplified manner. FIG. 2 shows the gauge pin 15 in unloaded condition in which no significant pulling force acts on the lower link 14. When the sleeve 14 of the gauge pin 15 bends under the action of the pulling force F, as shown by the bending line 48 in FIG. 3 in exaggerated manner, the gauge stick 35 which is fixedly clamped with its cylindrical portion 37 maintains its tangential position relative to the sleeve 34 in the region of the clamping point. Since practically no pulling force acts on the free end 39 of the gauge stick 35, it maintains its straight shape. The gauge stick 35 thereby assumes a position which is identified in FIG. 3 by the tangent 49 to the bending line 48 in the inner bearing ear 32. The free end 39 of the gauge stick 35 lies outside of both bearing points 31 and 32 approximately by the distance l from the outer bearing ear 31. The portion of the sleeve 34, which extends outwardly beyond the outer bearing ear 31, together with its extension 45 and a part of the pick-up 43 is no longer deformed by the pulling forces in the lower link 14 and assume thereby in the case of the loaded gauge pin 15 a position which corresponds to a second tangent 51 to the bending line 48 in the outer bearing ear 31. The pick-up 43 thereby detects a stroke s which it supplies further to the regulating linkage 29. The stroke s is the function of an angle 52 enclosed between both tangents 49 and 51.

In the gauge pin 15 shown in FIGS. 2 and 3, the sleeve 35 is deformed under load in accordance with the loading case of two-side freely lying support, since the sleeve 34 is arranged with a respective play in the bearing ear 31 and 32. Simultaneously the gauge stick 35 operates as a one-side fixedly clamped free support, whereas the clamping point 37 lies at least in the region of the bearing ear 32 and the free end 39 lies at least in the region of the other bearing ear 31. With this construction the mechanically operating gauge pin 15 produces a sufficiently high displacement signal which is suitable for processing in the mechanical regulating linkage 29. The decrease of the displacement s affect through the pick-up 43 outside the bearing ears 31 and 32 and between the bending elastic element 34 and non-bending elastic element 35 advantageously on its magnitude, as well as the bearing of the pick-up 43 on the gauge pin 15. The magnitude of the displacement s is dependent on the magnitude of the pulling force in the lower link 14.

When because of special conditions on the plow 12 and in the three-point linkage 11 pressing forces take place in the lower link 14, they can be measured by the gauge pin 15 and respective signals are supplied to the regulating linkage 29. Despite the play of the sleeve 34 in the bearing ears 31 and 32, this favors the pick-up 43 mounted on the gauge pin 14.

FIG. 4 shows longitudinal section of a second gauge pin 60 which distinguishes from the gauge pin of FIG. 2 first of all by its integrated signal amplification. The elements which are identical with the gauge pin of FIG. 2 are identified with same reference numerals. The distinctions between the gauge pin 60 and the gauge pin 15 of FIG. 2 are described herein below.

The sleeve 34 has an outer portion 61 which is associated with the outer bearing ear 31. A threaded sleeve 62 is screwed in the portion 61. The threaded sleeve 62 has a recess 63 which faces toward the sleeve opening 36. A two-arm transmission lever 64 with a spherical head 65 is supported in the recess 63. The transmission lever 64 has a shorter lever arm 63 extending inwardly and having a spherical head end 67 located in a blind hole 67 on the free ends 39 of the gauge stick 35. A longer lever arm 69 of the transmission lever 64 engages through the threaded sleeve 62 outwardly, and an output signal of the gauge pin 60 is picked from its head end 71. For this purpose the gauge stick 35 is formed somewhat shorter so that the transmission lever 64 can be arranged substantially in the sleeve 34 with second gauge pin 60.

The operation of the second gauge pin 60 corresponds to the operation of the first gauge pin 15. However, the output signal s taken on the head end 71 is increased in correspondence with the ratio of the longer lever arm 64 to the shorter lever arm 66. Because of the support of the transmission lever 64 inside the second gauge pin 60, an exceptionally compact, simple and robust construction is provided. High output signal produced in this case with the use of the gauge pin 60 is favorable for a mechanical tractor regulation, wherein the mechanical transmission of the signals to the regulating valve must be provided with as small as possible amplification. The arrangement of the spherical pivots on the transmission lever enables an especially simple construction in which additional rotation-securing means are dispensed with and in which the play can be adjusted in a stepless manner.

FIG. 5 shows a longitudinal section of a third gauge pin 75 shown in a simplified manner, in a loaded condition. The third gauge pin 75 differs from the first gauge pin 15 first of all in that a pin-fixed covering disc 77 with a guiding slot 78 is arranged on its outer end side 76. The free end 39 of the gauge pin 35 extends through the guiding slot 78 of the covering disc 77. Moreover, for reduction of friction the gauge pin 35 is formed in its cross-section so that it is relatively stiff in the measuring direction and relatively soft in the direction which is normal to the measuring direction because of the cross-section 40.

As shown in FIG. 6 the free end 39 is guided in the guiding slot 78 so that the output signal of the third gauge pin 75 is indicated only in the direction to be measured of the pulling force F in the lower link 14. During mere transport movement of the tractor 10, the gauge pin 35 can be bent, however no measuring displacement is shown on its end 39. Such a construction is especially advantageous when the respective pick-up on the gauge pin 75 cannot differ in the direction of the displacement. Furthermore, it is especially advantageous when the inner wall of the throughgoing opening 36 in the sleeve 34 serves simultaneously as an abutment for the free end 39 of the gauge pins 35 and thereby limits its maximal deviation.

FIG. 7 shows a section of a second arrangement 80 in a simplified manner in the loaded condition. The second arrangement 80 utilizes the same gauge pin 50 as the first arrangement 30 in accordance with FIG. 2. It however differs from the latter first of all by differently formed bearing points. Elements which are similar to the elements of the first arrangement are identified with the same reference numerals. Whereas in the first arrangement in accordance with FIG. 2 both bearing ears 31 and 32 are rigidly connected with the housing 16 of the tractor 10, in the second arrangement both bearing ears 31 and 32 are connected via a bending-elastic hinge 81 or 82 with the housing 16. Each hinge 81 and 82 has a plurality of parallel strip-shaped leaf spring elements 83. The leaf spring elements 83 are fixedly connected with their ends respectively to the housing 16 and to the bearing ear 31 or 32.

With the unloaded gauge pin 15, the leaf spring elements 83 of both hinges 81 and 82 extend parallel to one another and hold both bearing ears 31 and 32 so that their longitudinal axes are identical. In the loaded condition of the gauge pin 15, shown in FIG. 7, both bearing ears 31 and 32 can follow the bending of the sleeve 34 because of the elasticity of the hinges 81 and 82. This has the advantage that no edge pressure takes place on the gauge pin 15 in the region of the bearing ears 31 and 32. Its operational length remains unchanged. Despite the fact that the gauge pin 15 is fixedly clamped in the bearing ears 31 and 32, the gauge pin 15 operates in the second arrangement 80 in the case of loading approximately as a two-side freely lying support which produces in connection with the one-side fixedly clamped gauge stick 35 a high output signal. Since in the fixedly clamped sleeve 34 no relative movement and thereby no friction can take place between it and the bearing ears 31 and 32, the second arrangement 80 operates especially hysteresis-free. The measuring results are especially accurate and easily reproducible.

FIG. 8 shows a third arrangement 90 in which elements identical with the elements of the arrangement of FIG. 2 are identified with the same reference numerals, and which differs from the arrangement of FIG. 2 as will be described herein below.

In the third arrangement 90 both bearing ears 31 and 32 are again fixedly connected with the housing 16. The lower ring 14 is turnably supported within both bearing ears 31 and 32 with the aid of forth gauge pin 91 which instead of a circular cross-section has a spherical cross-section as shown in FIG. 9.

The fourth gauge pin 91 includes substantially a bar-shaped square steel which has centrally a throughgoing opening 36 which can be seen in FIG. 8 in connection with FIG. 9. The gauge pin 91 has an outer portion 92 associated with the outer bearing ear 31, an intermediate portion 93 associated with the spherical sleeve 33, and an inner portion 94 associated with the inner bearing ear 32. Elongated openings 95 and 96 are arranged between these portions. Two pairs of square springs 97 and 98 are formed in this manner in the pin 91, and they allow bending of the gauge pin 91 in the event of load acting on the lower link 14. The square shape protects the gauge pin 91 from turning.

A gauge stick 99 is arranged in the opening 36 and guided in the throughgoing openings 36 with its first spherical portion 101 in the region of the portion 94 and with its second spherical portion 102 in the region of the intermediate portion 93. A conical portion 38 extends from the second portion 102 outwardly of the opening 36 to the free end 39. The free end 39 is loaded by a pulling spring 100, since the spherical portions 101 and 102 are supported with play. Thereby a play compensation is provided.

Figure 10:
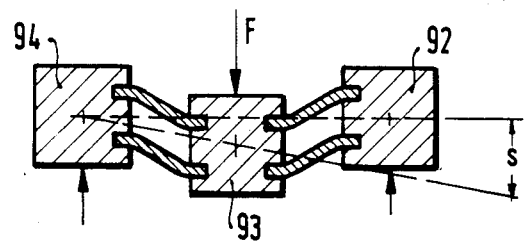
FIG. 10 is a schematic deformation diagram of the gauge pin of FIG. 8.

The second pin 91 is fixedly clamped in the region of its both portions 92 and 94 in the bearing ears 31 and 32. The spherical sleeve 33 is arranged rotary-fixed on the central portion 93. If the lower link 14 is loaded with the pulling forces a deformation diagram takes place as shown in FIG. 10 in simplified manner. The central portion 93 springs because it is elastically suspended at its both sides via the square spring pairs 97 and 98 on the outer portion 92 and the inner portion 94. In the loaded condition the first spherical portion 101 of the gauge pin 99 remains unchanged in its position. The central portion 93 which springs as shown in FIG. 10 deforms via the second spherical portion 102 the gauge pin 99 from the shown rest position by the effective spring displacement. Since the conical portion 38 remains stiff, the spring displacement acting on the portion 102 to the free end 39 is amplified in correspondence with the transmission ratio, so that a sufficiently high output signal is available.

The third arrangement 90 operates in a hysteresis-free manner, since no relative movement in the bearing points takes place. Moreover, accurately reproduceable measuring values are possible here, since the supporting points of the gauge pin 91 in both bearing ears 31 and 32 cannot move or are not affected. Moreover, the third arrangement 90 is especially suitable for alternating force directions in the lower link 14, when in addition to the pulling forces also pressing forces take place. The third arrangement 90 has moreover especially good wear condition. FIG. 11 shows, in correspondence with FIG. 9, a cross-section through a gauge pin 104 which differs from the gauge pin of FIG. 8 by its circular shape instead of the square shape. The circular shape facilitates the manufacture but is not favorable in the sense of the bending loading as compared with the square cross-section. A free rotation 105 takes place between its portions 94, 93, 42.

The gauge pins in accordance with FIGS. 8 and 11 can be used in two ways, namely they can be fixedly clamped at both sides, and also as a free lying support which can be advantageous in some cases.

Figure 12:
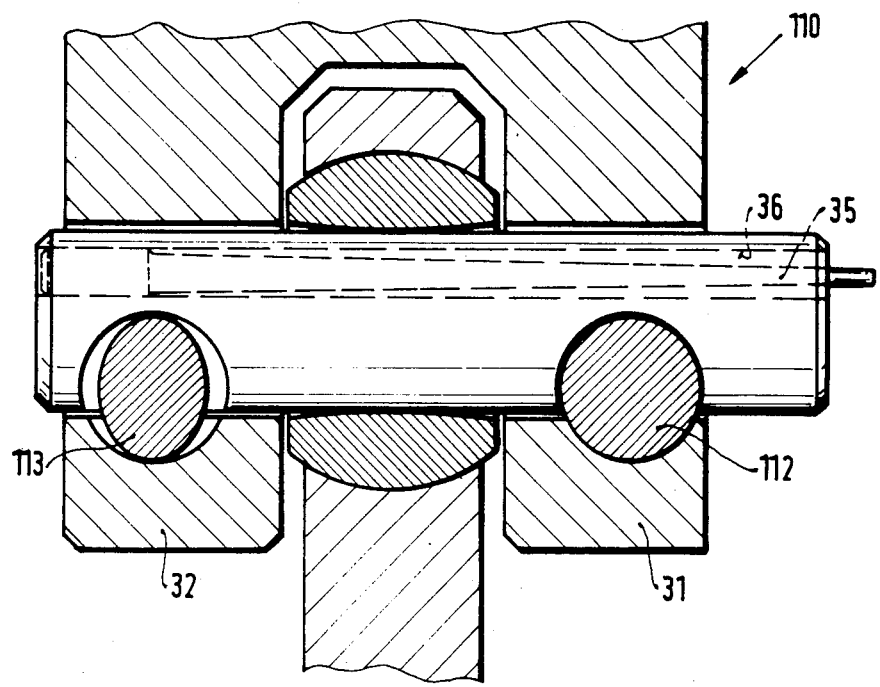
FIG. 12 is a simplified illustration of a longitudinal section through a part of the arrangement in accordance with a fourth embodiment of the invention.

FIG. 12 shows a part of a fourth arrangement 110 in which elements corresponding to the elements of the first arrangement 30 of FIG. 2 are identified with same reference numerals and which differs from this arrangement as will be explained herein below.

The fourth arrangement 110 has a gauge pin 111 which is supported in its both bearing ears 31 and 32 with transverse pins 112 and 113, respectively. The transverse pins 112 and 113 are parallel to one another and extend substantially with their longitudinal axes normal to the plane in which the force acts upon the lower link 14. In addition, their longitudinal axes lie at a distance from the longitudinal axis of the gauge pin 111, so that the transverse pins 112 and 113 do not intersect the opening 36 which receives the gauge stick 35 and which extends eccentrically to the longitudinal axis of the gauge pin 111. For absorbing tolerance and elongation changes, the inwardly located pin 113 has an oval cross-section.

The operation of the fourth arrangement 110 substantially corresponds to the operation of the arrangement 30 of FIG. 2. Because of the support by means of transverse pins 112 and 113, the displacement which conventionally takes place during bending of the gauge pin 111 in the bearing ears 31 and 32 and therefore friction connected therewith are eliminated. Therefore the fourth arrangement 110 operates in an especially hysteresis-free manner.

It is to be understood that in the shown embodiments various changes are possible without deviation from the spirit of the present invention. Although the solution shown in FIG. 2 is especially advantageous, the pick-up 43 can instead be mounted on the gauge pin 15 directly on the outer bearing ear 31. This is however true only when the sleeve 34 at its both ends is fixedly clamped in the bearing ears 31 and 32, as is possible in the case of FIGS. 7 and 8. The detected output signal s is thereby somewhat smaller since the only difference between the free end 39 and the unloaded straight sleeve 50 is detected, which distance is a function of the angle 50'. On the other hand, the housing-fixed arrangement of the pick-up 43 guarantees a simple and robust construction. It is to be understood that also the pivots 81 and 82 of FIG. 7 can be formed in another manner as long as their bending function is maintained. It is desirable for example to form suspension of the bearing ears 31 and 32 by dish-shaped bending elastic deformation elements, which can also formed disc-shaped. Instead of the shown mechanical pick-up 43, the gauge stick can be coupled with a suitable electromechanical or electrohydraulic converter. Therefore the arrangement in addition to the above shown mechanical regulating device, can also be used for fully hydraulic, electrical or mixedly operating regulating devices. Furthermore, the arrangement can also be used for measurements of the forces, both pulling forces and pressing forces, in the upper link of a three-point linkage.

Finally, in arrangement 90 of FIG. 8 the gauge stick 99 can be fixedly clamped with a cylindrical portion instead of the support with the spherical portion 101. The portion which is connected with the spherical portion 102 will operate here as a hinge. Thereby the cylindrical portion extends always parallel to the sleeve and the free end 39 provides a higher output signal when the gauge pin is loaded.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for mechanical measurement and for regulation of a pulling force of a tractor having a linkage including a plurality of links and lifting means arranged to adjust the linkage in dependence on a pulling force, the arrangement comprising two housing-fixed bearing points; a bending-elastic element arranged to take up pulling forces; sensing means arranged to sense bending of said bending-elastic element and to act upon the lifting means, said sensing means including a gauge stick which is not bending-elastic in a measuring direction, said gauge stick having one end which is fixedly mounted in said bending-elastic element and another free end from which a control signal is taken in the form of a displacement, said bending-elastic element being formed as a pin arranged to support one of the links between said housing-fixed bearings points and having an inner hollow, said gauge stick being arranged in said hollow of said pin and formed so as to extend substantially between said bearing points, said pin being arranged in said bearing points with a play therebetween with said play being sufficient to thereby form relative to said bearing points a two-side freely lying support, while said gauge stick is formed as a free support which is fixedly clamped in the region of one of said bearing points and whose free end extends outwardly beyond the region of the other bearing point, said gauge stick being connected with said pin in a connecting point, said pin being bendable along a bending line, said pin and said gauge stick being formed so that the control signal is determined at least by a magnitude of distance associated with an angle which is enclosed between a tangent to said bending line of said pin in bent condition at said connecting point of said gauge stick and the position of said pin in unloaded condition, said magnitude of distance being measured in the region outwardly beyond the other bearing point.

2. An arrangement as defined in claim 1, wherein said pin and said gauge stick are formed so that the control signal is determined by an angle between said tangent at said connecting point and another tangent of said pin at the other bearing point along said bending line of said pin.

3. An arrangement as defined in claim 1, wherein said gauge stick has a cross-section which reduces from said connecting point to said free end.

4. An arrangement as defined in claim 3, wherein said gauge pin has a conical cross-section reducing from said connecting point to said free end.

5. An arrangement as defined in claim 1, wherein said pin has a throughgoing opening which defines said inner hollow.

6. An arrangement as defined in claim 1, wherein said pin is formed as a sleeve having an extension extending outwardly beyond the other bearing point; and further comprising a displacement pick-up arranged on said extension of said sleeve.

7. An arrangement as defined in claim 1, wherein said pin is formed as a sleeve, said free end of said gauge stick extending outwardly of said sleeve for taking the control signal.

8. An arrangement as defined in claim 1, wherein said pin is formed as a sleeve of elastic steel.

9. An arrangement as defined in claim 1, wherein said bearing points are formed as bearing ears, said gauge stick having an axis, said inner hollow of said pin being formed by an opening which receives said gauge stick; and further comprising transverse pins which extend parallel to one another and support said pin in said bearing ears, said transverse pins having longitudinal axes extending at a distance from said axis of said gauge pin and at a distance from said opening.

10. An arrangement as defined in claim 9, wherein at least one of said transverse pins has an oval cross-section with two curvatures with two center points.

11. An arrangement for mechanical measurement and for regulation of a pulling force of a tractor having a linkage including a plurality of links and lifting means arranged to adjust the linkage in dependence on a pulling force, the arrangement comprising two housing-fixed bearing points arranged to be located at opposite sides of one of the links; a bending-elastic element arranged to take up pulling force; sensing means arranged to sense bending of said bending-elastic element and to act upon the lifting means, said sensing means including a gauge stick which is not bending-elastic in a measuring direction, said gauge stick having one end which is fixedly mounted in said bending-elastic element and another free end from which a control signal is taken in the form of a displacement, said bending-elastic element being formed as a pin arranged to support said one link between said two housing-fixed bearings points and having an inner hollow, said gauge stick being arranged in said hollow of said pin and formed so as to extend substantially between said bearing points, said pin being arranged in said bearing points with a play therebetween with said play being sufficient to thereby form relative to said bearing points a two-side free lying support, said pin also adapted to extend through said one link with a play therebetween, while said gauge stick is formed as a free support which is fixedly clamped in the region of one of said bearing points and whose free end extends outwardly beyond the region of the other bearing point, said gauge stick being connected with said pin in a connecting point, said pin being bendable along a bending line, said pin and said gauge stick being formed so that the control signal is determined by a magnitude of distance associated with an angle which is enclosed between a tangent to said bending line of said pin in bent condition at said connecting point of said gauge stick and the position of said stick in unloaded condition, said magnitude of distance being measured in the region outwardly beyond the other bearing point.

* * * * *